(12) United States Patent
Fink et al.

(10) Patent No.: US 11,823,310 B2
(45) Date of Patent: Nov. 21, 2023

(54) CONTEXT-AWARE SELECTIVE OBJECT REPLACEMENT

(71) Applicant: STREEM, INC., Portland, OR (US)

(72) Inventors: Ryan R. Fink, Vancouver, WA (US); Sean M. Adkinson, North Plains, OR (US)

(73) Assignee: STREEM, LLC., Portland, OR (US)

(*) Notice: Subject to any disclaimer, the term of this patent is extended or adjusted under 35 U.S.C. 154(b) by 0 days.

(21) Appl. No.: 16/563,734

(22) Filed: Sep. 6, 2019

(65) Prior Publication Data

US 2020/0082588 A1 Mar. 12, 2020

Related U.S. Application Data

(60) Provisional application No. 62/728,295, filed on Sep. 7, 2018.

(51) Int. Cl.
| | |
|---|---|
| *G06T 11/60* | (2006.01) |
| *G06T 7/70* | (2017.01) |
| *G10L 15/08* | (2006.01) |
| *G10L 15/22* | (2006.01) |
| *G06V 20/40* | (2022.01) |
| *G06V 30/262* | (2022.01) |

(52) U.S. Cl.
CPC .............. *G06T 11/60* (2013.01); *G06T 7/70* (2017.01); *G06V 20/41* (2022.01); *G06V 30/274* (2022.01); *G10L 15/08* (2013.01); *G10L 15/22* (2013.01); *G10L 2015/088* (2013.01)

(58) Field of Classification Search
CPC ....... G06T 11/60; G06T 7/70; G06K 9/00718; G06K 9/726; G10L 2015/088; G10L 15/08; G10L 15/22
See application file for complete search history.

(56) References Cited

U.S. PATENT DOCUMENTS

| | | | | |
|---|---|---|---|---|
| 5,184,306 A | * | 2/1993 | Erdman ............. | G05B 19/4207 700/182 |
| 5,566,877 A | * | 10/1996 | McCormack ...... | G01N 21/8803 348/130 |
| 7,080,979 B2 | * | 7/2006 | Rubbert ................. | G16H 50/50 433/213 |
| 10,678,849 B1 | * | 6/2020 | Ouimet ................ | G06V 10/764 |
| 2004/0001165 A1 | * | 1/2004 | Shiota ..................... | G06T 5/009 348/678 |
| 2012/0128263 A1 | * | 5/2012 | Van Der Ven .......... | G06T 5/003 382/261 |

(Continued)

*Primary Examiner* — Kevin Ky
(74) *Attorney, Agent, or Firm* — Schwabe Williamson & Wyatt

(57) ABSTRACT

Methods for replacing or obscuring objects detected in an image or video on the basis of image context are disclosed. Context of the image or video may be obtained via pattern recognition on audio associated with the image or video, by user-supplied context, and/or by context derived from image capture, such as the nature of an application used to capture the image. The image or video may be analyzed for object detection and recognition, and depending upon policy, the image or video context used to select objects related or unrelated to the context for replacement or obfuscation. The selected objects may then be replaced with generic objects rendered from 3D models, or blurred or otherwise obscured.

14 Claims, 5 Drawing Sheets

(56) References Cited

U.S. PATENT DOCUMENTS

| | | | |
|---|---|---|---|
| 2013/0039409 A1* | 2/2013 | Gupta | G06V 10/25 375/E7.126 |
| 2013/0141530 A1* | 6/2013 | Zavesky | G06T 19/20 348/43 |
| 2013/0162639 A1* | 6/2013 | Muench | A63F 13/655 345/419 |
| 2013/0291079 A1* | 10/2013 | Lowe | G06F 21/00 726/7 |
| 2015/0007351 A1* | 1/2015 | Janajri | H04L 51/10 726/30 |
| 2015/0070516 A1* | 3/2015 | Shoemake | H04N 21/4542 348/207.11 |
| 2016/0062116 A1* | 3/2016 | Ham | G02B 27/017 345/156 |
| 2016/0147795 A1* | 5/2016 | Tan | G06F 16/583 707/706 |
| 2017/0323158 A1* | 11/2017 | Gordon | G06F 16/5866 |
| 2017/0366744 A1* | 12/2017 | Cudak | H04N 23/633 |
| 2018/0349417 A1* | 12/2018 | Lu | G06F 16/532 |
| 2018/0367835 A1* | 12/2018 | Hamidi-Rad | G06T 11/60 |
| 2019/0096105 A1* | 3/2019 | Osotio | G06T 19/00 |
| 2019/0139576 A1* | 5/2019 | Delaney | G06V 20/46 |
| 2019/0303448 A1* | 10/2019 | Colangelo | G06F 16/48 |
| 2019/0362473 A1* | 11/2019 | Scott | G06V 20/10 |
| 2020/0138394 A1* | 5/2020 | Vanden Berghe | G16H 50/30 |

* cited by examiner

CONTEXT-AWARE SELECTIVE OBJECT REPLACEMENT

CROSS-REFERENCE TO RELATED APPLICATIONS

This application claims the benefit of U.S. Provisional Application No. 62/728,295, filed on Sep. 7, 2018, the entire contents of which are hereby incorporated by reference herein.

TECHNICAL FIELD

The present disclosure relates to the field of image processing, and more particularly to automatic selective replacement of objects in an image or video stream based upon context.

BACKGROUND

Image manipulation (both still images and images in the form of video streams or clips) allows for the addition or removal of objects within an image. Manual manipulation of an image, such as by use of a photo editor, like Adobe® Photoshop or Affinity® Photo, for still images or, for videos, a video editor such as Adobe® Premier, Apple® Final Cut Pro, or Avid® Media Composer, has been possible since the advent of computer systems offering graphical interfaces. The development of systems with sufficient processing power to capture high-definition still images and video has since enabled on-the-fly manipulation of images, such as the dynamic application of filters and overlays. Newer technologies, such as augmented reality (AR), offer still further capabilities to manipulate images by the placement of new objects in-frame that can have the appearance of three-dimensional objects, as if such objects were part of or set within the original scene.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
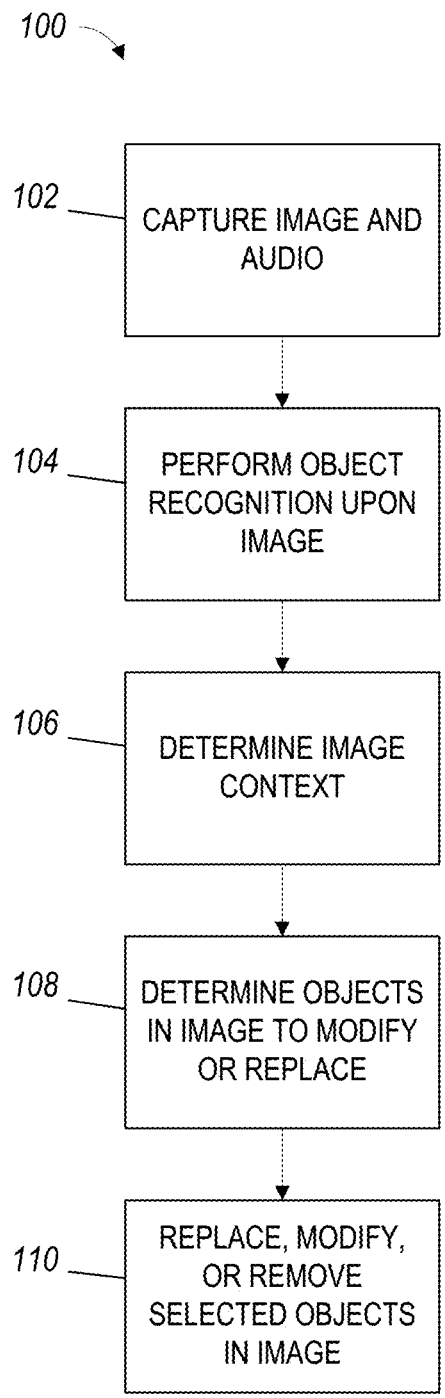
FIG. 1 is a flowchart of a method for context-aware selective object replacement, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

The adoption of widespread broadband Internet connectivity as well as devices such as smartphones and computers equipped with cameras has enabled people to communicate in real-time via video and audio links, such as Apple's Facetime, Google's Duo, and Microsoft's Skype. Such communication applications has further enabled the delivery of a variety of services remotely that heretofore would either be impracticable or impossible without the ability to transmit images and/or video, such as music lessons, distance learning, and craft assistance (e.g. help with do-it-yourself repairs).

One drawback to such enabling technology, however, is the possibility of recording and/or transmitting unwanted images to third parties. For example, a person using Skype to receive music lessons may establish a video link to a device located inside their home. As a result, incautious camera positioning may allow various objects and/or images of family members within the person's home to be inadvertently delivered to the teacher. Such disclosure may be undesirable to the person but nevertheless unavoidable, such as where family members walk into the camera frame or bump or move the camera.

Disclosed embodiments include systems and methods that automatically detect non-relevant portions of an image or video, e.g. objects or persons, to be overlaid with other objects or images, such as a generic object of the same type as the object being replaced, or to be edited, such as by censoring or blurring. To determine portions of an image or video that need substitution or editing, recognition techniques such as object recognition may be performed on images and/or video streams to detect and locate objects in-frame. To determine which objects of the detected objects need to be replaced or edited, the context of the images and/or video streams is determined. Context may be determined from a variety of sources. For example, captured audio may be processed with recognition techniques such as pattern recognition and/or automatic speech recognition, which can be performed on audio streams that correspond with the images or video. Other possible sources of image or video context include tags associated with the images and/or video (e.g. as may be stored in image or video metadata), user-provided context, the image itself (e.g. objects that are centrally located in a frame are more likely to be relevant that objects located in the frame periphery), or any other source of information about the subject matter of the images or video.

The recognized patterns (such as one or more sounds or words, detected objects, tags, user-supplied information, metadata, etc.) can provide context for the subject of the video, which may then allow automatic or semi-automatic selection from the detected objects of only relevant objects to be edited or replaced. Depending upon the device used to capture an image or video, such object replacement or editing may be effected in real-time, with an image or video captured and transmitted, such as from a smartphone. Such real-time editing may enable a user to receive distance services that may require video without concern that personal objects and/or family members will be inadvertently transmitted to strangers. In other scenarios or implementations, object replacement or editing may be done subsequent to capture, such as by a server or system that houses or otherwise has access to the captured image or video.

As used herein, when not explicitly stated, either of the terms "image" or "video" may include one or more still images, one or more video streams, or any combination of the foregoing.

FIG. 1 depicts the operations of a method 100 for context-aware automatic replacement or editing of objects in an image or video stream. One or more of the various operations may be performed by a computer device 500 described herein, or by another suitable device or system.

In embodiments, method 100 begins with operation 102, where an image and audio stream are captured. The image may be one or more still images, or a video clip. In various embodiments, the audio may be captured as part of a video clip, or as a separate stream, such as where still images are used with method 100, or in double-system recording, where video and audio are captured separately for later editing and/or merging. For example, a video may be captured on a smartphone or tablet, which may provide both audio and images in the form of video. In another example, a camera may record video of a scene while the audio of the scene is captured simultaneously on a separate audio recorder, with the audio and video synced up and/or combined into a single file post-capture. In other embodiments, the audio may be captured at a separate time from any still images or video, either before or after, and later used to selectively replace or edit detected objects in the image or video stream, as will be described below. Where one or more still images are used, the one or more still images may be taken individually, such as with a still camera, or may be extracted from a video stream, such as via a frame grab.

In operation 104, in embodiments the image(s) or video may be processed with an object recognition algorithm. In some examples, object recognition may provide a list of all identified objects in a given image or video. The identification may include varying degrees of detail, e.g. type of object, object characteristics such as color, orientation, and size, object location in the image or within one or more video frames, time index where the object is visible (in the case of a video), movement of the object through the frame (in the case of a video), or any other type of information that may be ascertained via object detection. Object recognition may be performed on one, some, or all images where multiple images are processed against a single audio stream, or by one or multiple videos. Any algorithm or technique for object or shape detection suitable for machine vision or digital image processing within an image, e.g. feature detection algorithms such as a Hough transform, that is now known or later developed may be utilized for operation 104. Object recognition may further rely upon a database or store of various models to allow detected objects to be positively identified, which may be required in subsequent operations to carry out object replacement and/or editing. For example, a detected object such as a sink may be recognized as a collection of shapes, e.g. circles, rectangles, polygons, etc., which can be matched against a database of objects to positively identify the object as a sink. Suitable techniques are known in the field of machine vision and digital image processing. The result of example operation 104 is a set of identified objects and relevant associated properties, which can be used in subsequent operations for determination of whether object replacement and/or editing is required.

In some embodiments, where video is being processed, object recognition in operation 104 may be enhanced by the inclusion of spatial information captured simultaneously with the video. For example, a smartphone may be equipped with motion sensors (e.g. spatial sensors 309 in FIG. 3) such as accelerometers and gyroscopes that output spatial information, which allows the spatial orientation of the smartphone to be measured. This spatial information can assist object recognition, once an object has been recognized, in referencing the aforementioned database of models (which may include 3D models) and orienting a model corresponding to the recognized object. If the smartphone moves, the model can be reoriented in accordance with the movement as reflected by the spatial information, anticipating changes in the detected shapes of the object from the video.

In operation 106, the context of the image(s) or video is determined. Image context may be derived from any source of information about the video. In some embodiments, context may be supplied directly by the user, e.g. via direct entry or indication. In other embodiments, context may be inferred, e.g. via the nature of an app or interactions within the app used to capture the image(s) and/or video. Such an app may execute on a computer device 500, which may be implemented as a smartphone or tablet. For example, if video is captured via an app that is directed to home repair, the context may be generally determined to involve home repair. The user may further signal within the app a greater specificity, e.g. plumbing, electrical, HVAC, structural, etc., based upon selections made within the app. These selections can further inform and narrow the context of the video. For another example, a user may select to receive information or be connected with a specialist, such as electrical references or an electrician, which indicates that relevant objects would be related to electrical work. In yet other embodiments, metadata associated with the image(s) and/or video may provide context. For example, tags to a video or image such as "sports", "music", "lessons", "service", etc., help set and narrow context.

In still further embodiments, audio pattern recognition, such as automatic speech recognition (ASR) algorithms and algorithms to recognize non-speech sounds (collectively referred to as ASR algorithms), may be employed to determine context. As described above, the audio may have been recorded simultaneously with and integrated into a video file. Alternatively, the audio may be captured separate from the video, either simultaneously or at a different time. In some such embodiments, any arbitrary audio may be used to provide context, such as an unrelated recording that may nevertheless provide an appropriate context. Still further, a single audio stream may be used to automatically edit or replace detected objects in a combination of multiple still images and/or videos.

Where context is determined from an audio stream (regardless of whether recorded as a stand-alone stream or extracted from a video), the audio stream may be processed through one or more pattern recognition algorithms, which may include one or more automatic speech recognition (ASR) algorithms or modules, and/or a non-speech pattern recognition algorithm or module. In embodiments, the algorithms extract one or more recognized words from the audio stream. Where a non-speech pattern recognition is employed or included, the non-speech pattern recognition may extract sounds that can be attributed to objects, e.g. running water, washing machine cycle, toilet flush, etc. The extracted words and/or non-speech sounds may then parsed to determine the context of the image or video.

The pattern recognition routine may be capable of recognizing both speech (as an ASR algorithm) and non-speech sounds. In still other embodiments, both an ASR algorithm and a separate pattern recognition algorithm specific to non-speech sounds may be applied to the audio stream. For example, a given pattern recognition routine may be able to recognize both detected words as well as detected sounds, e.g. songs, notes, noises, etc. Such a routine may be able to identify songs, vehicles, animals, times (such as a clock chime), or any other object that may provide an identifiable noise signature. In yet other embodiments, a history or library of recognized sounds may be employed with the pattern recognition routine(s).

The output from the pattern recognition routine may comprise one or more words or identified sounds corresponding to the detected audio. In one such example, where an ASR routine is applied output may comprise a list of identified words, such as "the, this, me, car, travel, shop, time" and or noises/sounds, such as "bird, dog, car, train", song titles, movie titles, etc. ASR processing may be carried out locally, such as where method 100 is implemented upon a single computer device 500 like a smartphone or laptop, on a remote platform such as a server, data center, or cloud computing platform, or a combination of the foregoing. It should further be understood that the ASR routine may be configured to represent one or more different languages, e.g. English, Chinese, Spanish, Russian, Japanese, etc.

These are just a few possible examples; any other method or technique suitable for determining context of the image(s) and/or video may be employed. The choice of techniques employed may depend upon the nature of a given implementation. It should be understood that a combination of some or all of the foregoing techniques may be used to set context, e.g. metadata, app nature, and audio pattern recognition in combination. For example, context information derived from app usage may be used in conjunction with audio pattern recognition to filter words and sounds detected from an associated audio stream. Application of the context will be described in greater detail herein with respect to FIGS. 2A and 2B.

In operation 108, the context of the image(s) and/or video resulting from operation 106 is evaluated to determine which objects identified in operation 104 are candidates to be replaced or edited. Such evaluation may include correlating the identified objects with the context to separate detected objects into objects that are relevant to the context from operation 106, and objects that are irrelevant or only tangentially relevant. In some embodiments, objects having some relation to keywords identified in the context may not be replaced or edited, while objects that have little or no connection to any keywords in the context may be replaced or edited. For example, if context keywords include "plumbing", "sink", and "drain", identified objects such as pipes leading from a sink drain would be determined to be related to the context keywords, and so not edited or replaced. Conversely, a bowl of fruit on an adjacent counter would not be determined to be related to the context keywords, and so would be identified as a possible candidate editing or replacement.

As some objects may be questionably or tangentially relevant (e.g. cabinet doors beneath a sink that conceal drain pipes), relevance may be computed on a scale, such as percent relevant or likelihood of relevance. A threshold for relevance may be predetermined to definitively categorize detected objects as relevant or irrelevant. This process will be described in greater detail below. In other embodiments, all detected objects, regardless of relevance, may be subject to editing or replacement, with the context determining how the objects are to be edited or replaced, e.g. generic substitution for relevant items, and blurring or removal of non-relevant items.

In various embodiments, following determining relevance of detected objects with respect to the context of the image (s) and/or video, candidate objects are selected for editing or removal based upon predetermined policies. For example, a user of an app implementing a portion or all of method 100 may indicate that objects relevant to the context of the captured image(s) or video are to be replaced by generic models. In another example, a user may indicate that objects that are not relevant to the context of the captured image(s) or video are to be replaced by generic models or, alternatively, blurred, removed, or otherwise censored or obscured. In still another example, a user may suggest a policy that is a combination of the foregoing, where select objects, not relevant to the context of a video, are censored, and other objects relevant to the context are substituted with generic 3D versions. It will be appreciated that, for embodiments, whether a given object is a candidate for replacement or editing may not be determined solely by relevance, but rather by application of policy, as applied to relevance. Still other embodiments may forego operation 108 and simply replace all detected and recognized objects with models, effectively creating an image or video that has no uniquely identifiable objects.

As described above, audio may have been recorded simultaneously with and integrated into a video file, or may be separate from the video. Where the audio is captured prior to video capture, the audio may be processed through ASR algorithm(s) prior to video capture and used for object replacement or editing in operation 108 in real time as the video is captured. Likewise, where the audio is captured simultaneously with the video, real time audio processing and object replacement or editing may be performed. Alternatively, separate audio may be used for object replacement or editing upon any previously captured video, with the audio being processed and used for subsequent, e.g. post capture, editing or replacement in the video.

Finally, in operation 110, the candidate objects identified in operation 108 are either replaced, removed, or edited, per context and user intention. In some embodiments, operation 110 may include retrieving a generic model from a database, local store, cloud store, or other repository that matches the identification of the candidate object. For example, where the aforementioned sink is identified as a candidate for replacement, a generic 3D model for a sink may be obtained. The location of the sink in-frame and its size and perspective, previously determined in operation 104, are then provided to a rendering algorithm or module along with the model of the sink to render a 3D model that is superimposed over the location of the sink in the image or video. Where a video is subject to replacement, the replacement model may be rendered over time with a changing perspective that matches a changing perspective of the sink in the video. As will be discussed below with reference to FIG. 3, the changing perspective may be computed with reference to spatial information, such as information provided by spatial sensors 309.

In embodiments where object editing and/or removal is implemented, rather than retrieving a generic model, the object may simply be blurred, pixelated, blacked out, washed out, removed, or otherwise obscured. For example, where the policy used to determine candidate objects in operation 108 calls for non-relevant objects to be removed or excluded, editing to obscure the non-relevant objects may be selected instead of replacement with a generic object. In other embodiments, only a portion of an object may be obscured, such as a portion that would allow the object to be uniquely identified, or disclose private or otherwise irrelevant information about a person involved in the video or image.

In some embodiments, removal may be effected by replacing the object with background behind the object, thereby not just obscuring the object, but removing any indication of its presence. For example, a transient object, such as a person walking through the frame, may be removed. It will be understood that removal will require obtaining data about the background behind the object. In embodiments, such data may be obtained from previously captured image(s) and/or video of the scene without the object (e.g. a background plate), which may then be inserted over the object, or from previous frames in the same video where the object wasn't present (e.g. a transient object, such as a person). If the video is processed for object removal post-capture, subsequent frames may provide the necessary background information for replacement. In other embodiments where a background plate isn't available, appropriate background data may be extrapolated from the environment surrounding the object, similar to cloning background to remove an object. In still other embodiments, a user capturing the image or video may be prompted to capture a background to allow for object removal. In some embodiments, the background may be captured prior to video or image capture, in anticipation of effecting removal in real-time. Any suitable image manipulation technique for digital object removal from an image or video now known or later devised may be utilized.

In still other embodiments, operations 108 and 110 may be omitted in favor of simply disrupting capture of images or a video stream, until undesirable objects are no longer in view of the camera or otherwise in-frame.

Figure 2:
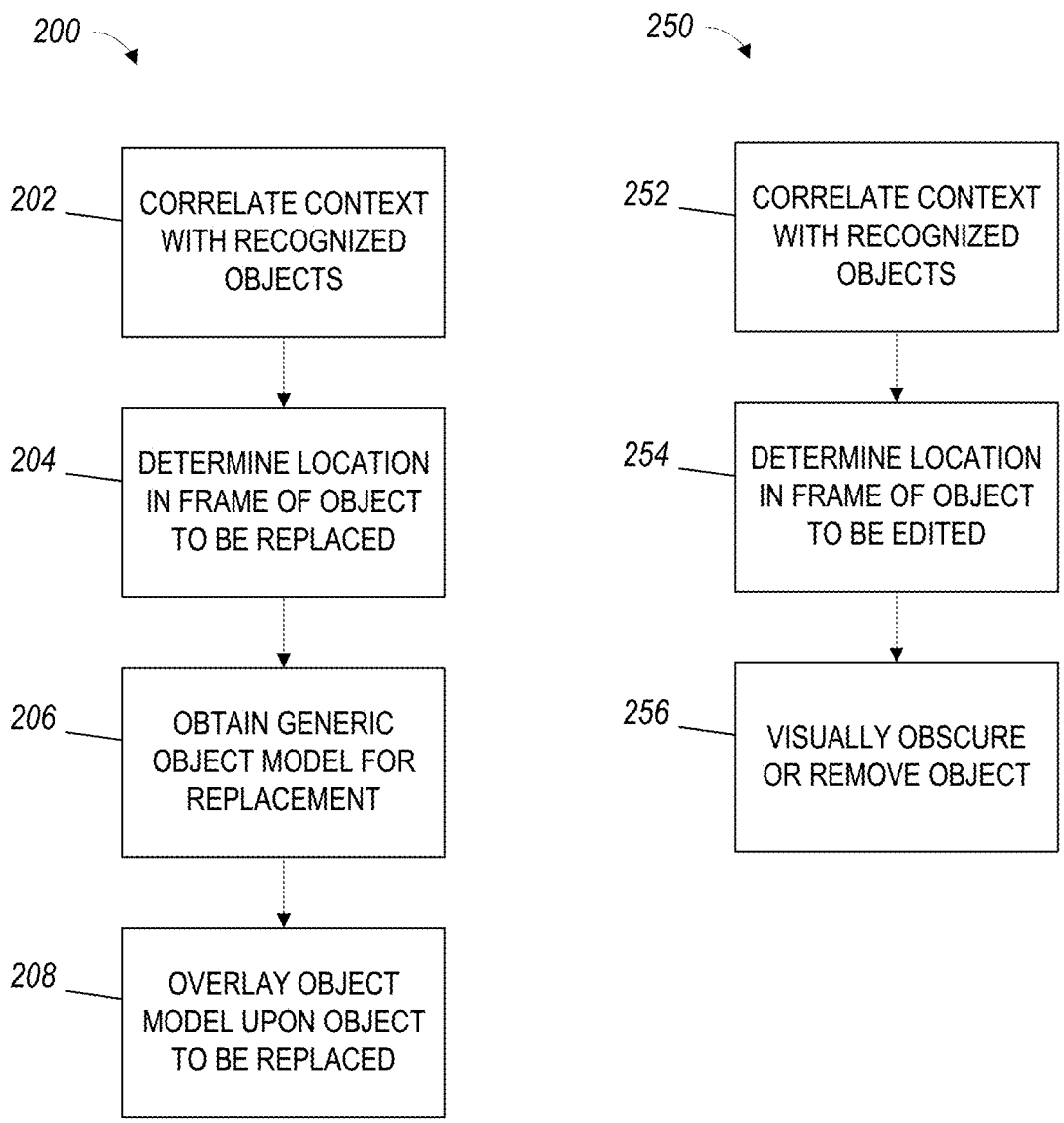
FIG. 2A is a flowchart of operations for determining how objects in an image are to be replaced, which may comprise one or more operations of the method depicted in FIG. 1, according to various embodiments.
FIG. 2B is a flowchart of operations for determining how objects in an image are to be obscured or edited, which may comprise one or more operations of the method depicted in FIG. 1, according to various embodiments.

FIG. 2A illustrates in detail various operations that may be carried out in connection with operations 108 and 110 of method 100 for replacement of objects with generic models, one or more of which may be carried out in whole or in part. Starting in operation 202, the context obtained in operation 106 is correlated with objects recognized from operation 104. The context obtained in operation 106 may comprise words and/or patterns derived variously from the user, app usage, ASR routines, pattern matching from captured audio, and/or other sources as described above. The recognized objects likewise may include words, phrases, and/or patterns associated with the recognized objects, which may be obtained from data associating objects with various identifiers, such as tags, definitions, etc. For example, a toilet may be recognized by object recognition, and associated with words such as "toilet", "bathroom", "water", "sanitation", "fixture", "white" (e.g. color), and/or other similar words. The words and/or patterns associated with the recognized objects may be used to search in the words and/or patterns from the context for matches (or vice-versa), and thereby allow a determination as to whether each recognized object is relevant to the image or video context.

As discussed above, in some embodiments, some recognized words may be more relevant than others, and so the context obtained in operation 106 may include weighting factors. The weighting factors may be assigned based upon various inputs, such as other aspects of the context, e.g. the parties involved in a video such as an electrician, plumber, teacher; the frequency of terminology and/or sounds in the audio, and/or any other appropriate aspect. For example, analysis of an audio stream may reveal the presence of numerous electrical or plumbing related terms, which may indicate that such terms are particularly relevant to context, and allow non-electrical related terms to be disregarded.

Alternatively, terms deemed relevant to context may be heavily weighted, with non-relevant terms correspondingly marginally weighted or assigned no weight. In some instances, some terms may be borderline, such as relatively non-specific building-related terms where the context is determined to be plumbing or electrical. For example, words such as "wall", "stud", "cabinet", or "panel" may have relevance to either plumbing or electrical (as well as other building-related topics), as well as other non-relevant items. A picture, for example, may be attached to a wall, much as electrical or plumbing may also be behind a wall. These quasi-relevant terms may be accorded a lesser weight than context-specific terms.

In some embodiments, quasi-relevant terms may be combined with the nature of a recognized object, and may also be evaluated with other context aspects, to make a final determination of whether to remove or edit the recognized object. For example, an object recognized as "picture" may be compared with "wall". If the context is determined as electrical or plumbing, the picture may be evaluated to be removed or edited. Conversely, if the context is interior decoration, the picture may be considered relevant, and not edited or removed.

In still other embodiments, context keywords may be assigned numerical weights. A detected object may be compared to relevant keywords, and accorded a weight, e.g. cumulative, aggregate, average, etc., determined from keywords deemed most relevant. A predetermined weight threshold may also be established, with objects having a determined weight that exceeds the predetermined threshold allowed to remain without alternation, and objects with weights below the threshold subject to editing or removal.

In operation 204, the location of each object within the frame of the image(s) or video to be replaced is determined. This determination may be made with respect to the coordinate system of the image or video. For example, a given object may be described as starting from a first x,y location, and then described as a shape or set of shapes drawn from the first location. The x,y location may correspond to a specific starting pixel within a frame captured by a camera. Alternatively, the object may be described as a set of x,y coordinates that include all pixels within the image or video covered by the object. Any suitable method for describing the location of an object within a 2-D image may be utilized.

Figure 3:
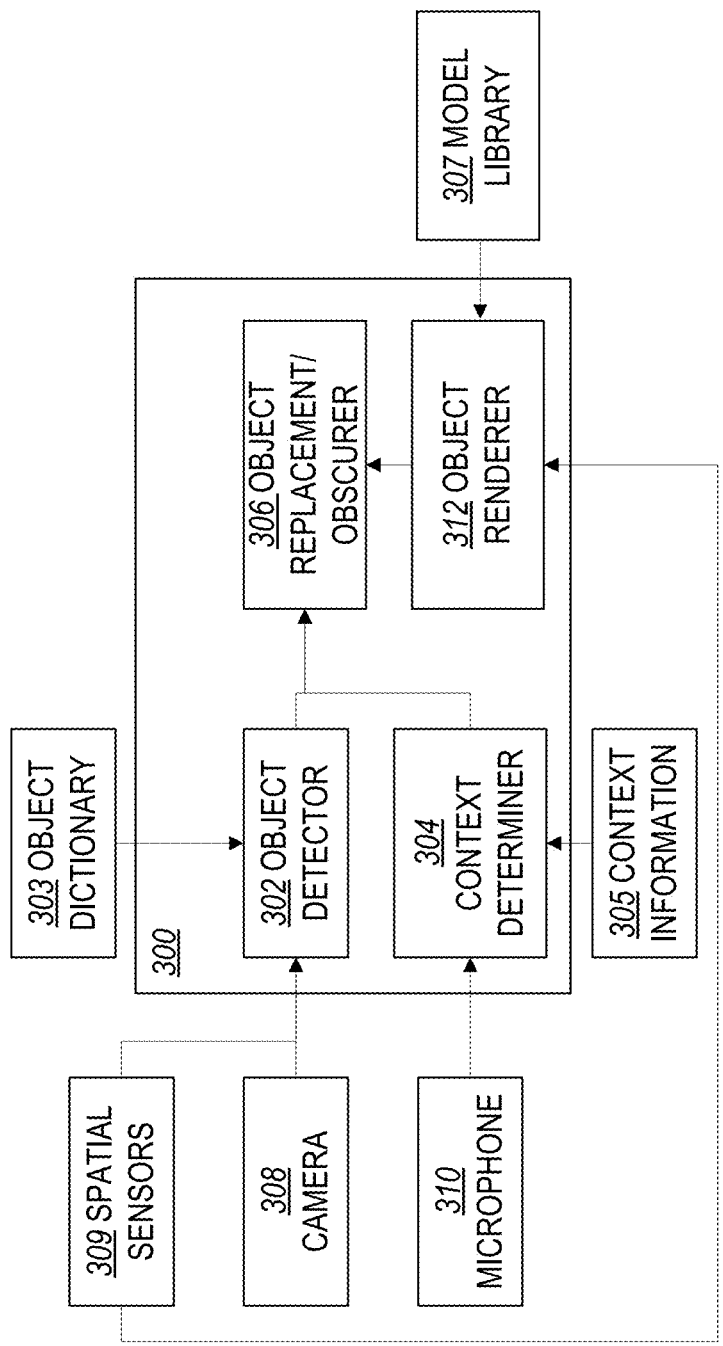
FIG. 3 is a block diagram of an example apparatus that may be configured to carry out the methods of FIGS. 1-2B, according to various embodiments.

In operation 206, a generic model of the recognized object to be replaced may be obtained for replacement, and in operation 208, the generic model is rotated and scaled to match the perspective and size in frame of the detected object, then rendered. The object may be scaled to match the perspective and size in frame based at least in part from spatial information obtained from one or more spatial sensors, such as spatial sensor 309 (FIG. 3). The spatial information may include the orientation of the capturing camera in space along with any movements (e.g. for video), that can be used in conjunction with object recognition to orient the object model for rendering, and to cause the object to appear to track the camera as it moves. The rendered object is then inserted into the image(s) or video by overlaying at the location of the recognized object determined in operation 204. The generic model used to create the rendered object may be obtained from an object library or store, or from any other suitable source. In some embodiments, the generic model may be rendered in a fashion to approximate the characteristics of the object to be replaced, as detected in operation 104. In other embodiments, the generic model may be rendered without regard to details of the object to be replaced, such as to preserve privacy by obscuring as many details as possible to maintain privacy.

Turning to FIG. 2B, the operations of a variation of method 200 is depicted, method 250. Operations 252 and 254 correspond and are substantially identical to operations 202 and 204 of method 200. In operation 256, rather than obtaining a generic model and overlaying it, as per operations 206 and 208, the detected object is visually obscured, removed, or replaced, such as by blurring, pixelation, or placing visual blocks over the object (e.g. black, white, colored, patterned shapes). Removal may be effected as described above, using various digital techniques to digitally replace an object with background. As with a rendered object, spatial information may be used to facilitate movement and potential reshaping of the blurred or otherwise obscured area as the camera moves, in the case of video.

Turning to FIG. 3, a block diagram of a possible system or apparatus to carry out methods 100, 200 and/or 250 is depicted. In various embodiments, apparatus 300 includes an object detector 302, a context determiner 304, and an object replacement/obscurer 306. Apparatus 300 may also include an object renderer 312. Apparatus 300 may be implemented in whole or in part in software, such as on a computer-readable medium, in hardware using dedicated logic components, such as a field-programmable gate array, or a combination of both. Apparatus 300 may run as software on a computer device 500, or computer device 500 may be designed in hardware to include the various components of apparatus 300. Object detector 302 may be configured to carry out operation 104 of method 100. Context determiner 304 may be configured to carry out operation 106 (and by association, operations 202 and 252 of methods 200 and 250, respectively) of method 100. Object replacement/obscurer 306 may carry out operations 108 and 100 of method 100, as well as operations 204-208 of method 200, and operations 254 and 256 of method 250. Coupled to object replacement/obscurer 306 may be object renderer 312, where apparatus 300 is to replace detected objects with generic models, per method 200. In embodiments of apparatus 300 where objects are only to be blurred or otherwise obscured, object renderer 312 may not be necessary.

Apparatus 300 may be in communication with a camera 308, one or more spatial sensors 309, and microphone 310 to receive images, spatial information, and an audio stream. Camera 308 and microphone 310 may be implemented using any known technology for image and audio pickup and recording. In some embodiments, camera 308 and microphone 310 may be a part of a smartphone, tablet, or other computer. In other embodiments, camera 308 and microphone 310 may be part of a stand-alone video camera. In still other embodiments, camera 308 may be a dedicated still camera such as a DSLR, and microphone 310 may be part of an unrelated recording apparatus. Spatial sensors 309 may be implemented with sensors such as accelerometers, gyroscopes, and/or any other suitable device for measuring spatial orientation and/or movements. The spatial sensors 309 may be implemented using MEMS technology, and/or may be a part of or embedded within a smartphone, tablet, laptop, camera, or another suitable device. Other embodiments are possible that are useable with method 100.

As can be seen, camera 308 may supply images and spatial sensors 309 may supply spatial information to object detector 302. Camera 308 may also act as an image store or to otherwise coordinate storage of images; in some embodiments, camera 308 may be substituted or supplemented with an image store. Similarly, microphone 310 may supply an audio stream or streams to context determiner 304. Spatial sensors 309 may further supply spatial information to object renderer 312, to assist in orienting objects from the model library 307 for rendering. These connections should be understood to only be logical; camera 308 (and microphone 310) need not be physically connected to apparatus 300. Camera 308 and microphone 310 may capture and store images and audio to a storage medium or other intermediate repository, to later be retrieved by apparatus 300 in carrying out method 100. Spatial sensors 309 may supply spatial information only to object detector 302, which may pass the spatial information to object renderer 312.

An object dictionary 303 may be in communication with or otherwise accessible to object detector 302. As described above with respect to method 100, object dictionary 303 may enable object detector 302 to positively identify recognized objects and associate any appropriate metadata or tags to such detected objects. For example, object dictionary 303 may include data necessary to positively identify an object as a "sink", "toilet", "water heater", or similar such fixture, where apparatus 300 may be used with home improvement or repairs. It should be understood that the content of object dictionary 303 may be tailored to a given intended purpose of apparatus 300, to save time and resources in searching the dictionary to match objects. Object dictionary 303 may be a part of apparatus 300, a part of object detector 302, or may be external, implemented as an external store, or a cloud-based or remote store, or any other implementation suitable to the intended use of apparatus 300.

Context determiner 304 may further receive input from a context information store 305, which may be stored separately or as a part of apparatus 300, and may be used in conjunction with operation 106. Context information store 305 may also include information such as app state, user input or indications of context, keywords/tags from image metadata, or any other source of context information as described above with respect to method 100. Context information store 305 may be stored as part of context determiner 304, as a separate part of apparatus 300, or as an external store that is otherwise accessible to apparatus 300, such as an external database or cloud or remote store.

Object renderer 312 may be in communication with a model library 307, which supplies generic 3D object models to object renderer 312 for creating replacement 3D objects for overlay on top of objects determined in operations 108 in method 100, and operations 206 and 208 in method 200. As with context information store 305 and object dictionary 303, model library 307 may be stored as part of object renderer 312, as a part of apparatus 300 (but logically separate from object renderer 312), or as external to apparatus 300, such as an external database, cloud store, or remote store. In some embodiments, model library 307 may be combined with object dictionary 303, or vice-versa; object dictionary 303 (or model library 307) may thus provide object model data to both object detector 302 and object renderer 312.

Apparatus 300 is depicted in logical blocks of functionality. It should be appreciated that the functionality suggested by the various blocks may be combined into a single module, or may be spread across other, different modules. Apparatus 300 may be implemented as multiple discrete units, such as two or more physically distinct devices. Further still, some parts or all of apparatus 300 may be implemented as hardware, such as by an implementation of computer device 500, while other portions (or even all of apparatus 300) may be implemented using software, running on a computer device 500 that is a generic computer. Still other embodiments may implement some or all of apparatus 300 in one or more custom-designed application specific modules.

Figure 4:
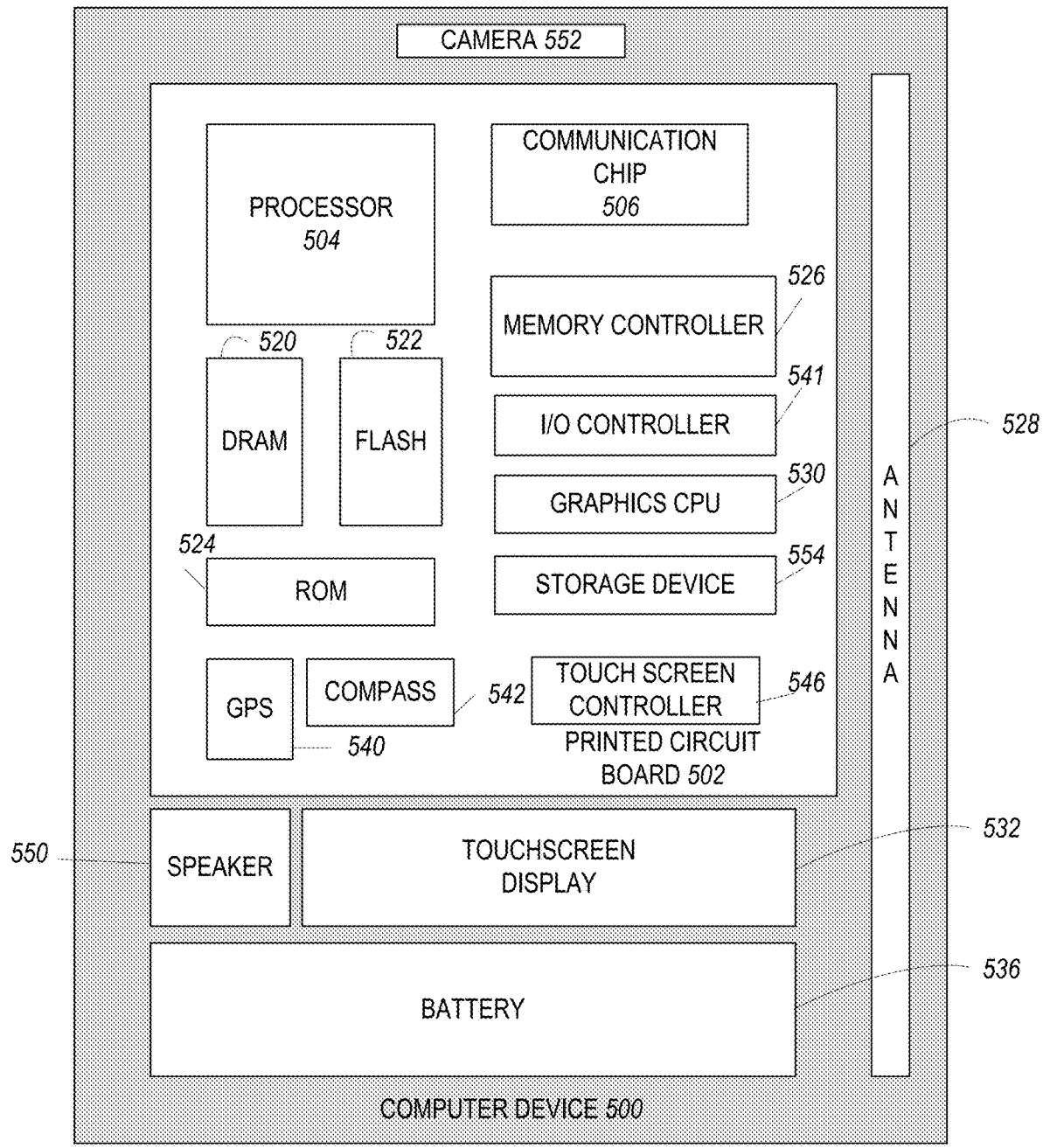
FIG. 4 is a block diagram of an example computer that can be used to implement some or all of the components of the system of FIG. 1, according to some embodiments.

FIG. 4 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the methods 100, 200, and/or 250, and/or apparatus 300 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 5:
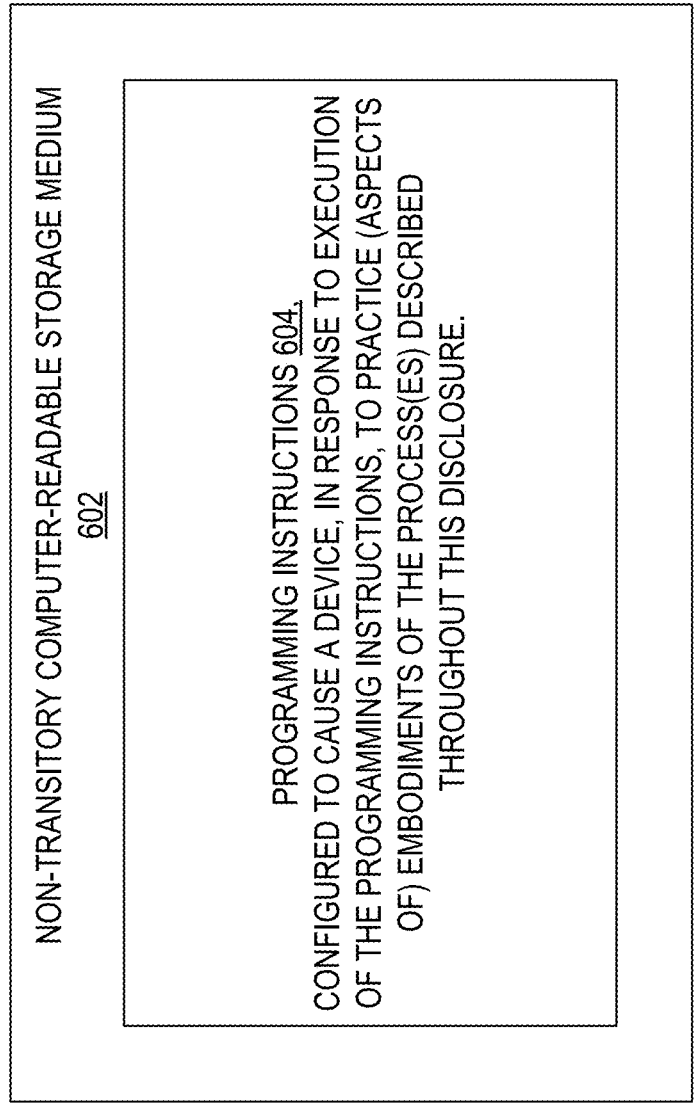
FIG. 5 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) methods 100, 200, and/or 250, and/or apparatus 300. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method, comprising:
receiving, at a server over a network from a remote device, an image, audio associated with the image, and spatial information about the image;
extracting, from the audio, one or more keywords;
determining, by the server, a context of the image, the context including the extracted keywords;
detecting, by the server using an object detection algorithm and the spatial information, one or more objects within the image;
comparing, by the server, each of the one or more objects with the image context; and
selectively modifying, by the server, each of the one or more objects in the image that does not relate to the image context by superimposing over each of the one or more objects with a generic 3D version of each of the one or more objects, each of the generic 3D versions having a size and perspective comparable to its respective replaced object.

2. The method of claim 1, wherein comparing each of the one or more objects with the image context comprises identifying each of the one or more objects, and comparing each of the one or more objects with each of the one or more keywords.

3. The method of claim 2, further comprising assigning a weight to each of the one or more keywords, and wherein comparing each of the one or more objects with the image context comprises assigning a weight to each of the one or more objects based upon the weight of each of the one or more keywords that are relevant to each of the one or more objects.

4. The method of claim 3, wherein selectively modifying each of the one or more objects that does not relate to the image context comprises selectively modifying each of the one or more objects that has a weight that falls below a predetermined threshold.

5. The method of claim 1, wherein determining the context of the image further comprises determining the context of the image based a type of application capturing the image.

6. A non-transitory computer-readable medium (CRM) comprising instructions that, when executed, cause the apparatus to:
- receive, over a network, a video, audio associated with the video, and spatial information about the video;
- extract, from the audio, one or more keywords;
- determine a context of the video, the context including the extracted keywords;
- detect, from the video and with the spatial information, one or more objects within the video using an object detection algorithm;
- compare each of the one or more objects with the video context; and
- selectively modify each of the one or more objects in the video that does not relate to the video context by superimposing over each of the one or more objects with a generic 3D version of each of the one or more objects, each of the generic 3D versions having a size and perspective comparable to its respective replaced object.

7. The CRM of claim 6, wherein the instructions further cause the apparatus to identify each of the one or more objects, and compare each of the one or more objects with each of the one or more keywords.

8. The CRM of claim 7, wherein the instructions further cause the apparatus to assign a weight to each of the one or more keywords, and assign a weight to each of the one or more objects based upon the weight of each of the one or more keywords that are relevant to each of the one or more objects.

9. The CRM of claim 8, wherein the instructions further cause the apparatus to selectively modify each of the one or more objects that has a weight that falls below a predetermined threshold.

10. An apparatus, comprising:
- an object detector;
- a context determiner; and
- an object replacer,
- wherein:
    - the object detector is to detect, using an object detection algorithm, one or more objects from a video and spatial information about the video,
    - the context determiner is to extract, from an associated audio, one or more keywords, and determine a context of the video from the extracted keywords, and
    - the object replacer is to compare each of the one or more objects with the video context, and selectively modify each of the one or more objects in the video that does not relate to the video context by superimposing over each of the one or more objects with a generic 3D version of each of the one or more objects, each of the generic 3D versions having a size and perspective comparable to its respective replaced object.

11. The apparatus of claim 10, wherein the apparatus is a mobile device.

12. The apparatus of claim 10, wherein the context determiner is to determine the context of the video from the associated audio with an automated speech recognition routine.

13. The apparatus of claim 12, wherein the context determiner is to further determine the context of the video from the associated audio with a non-speech recognition routine.

14. The apparatus of claim 10, wherein the object detector is to detect one or more objects from the video with reference to an object library.

* * * * *